Patented June 29, 1943

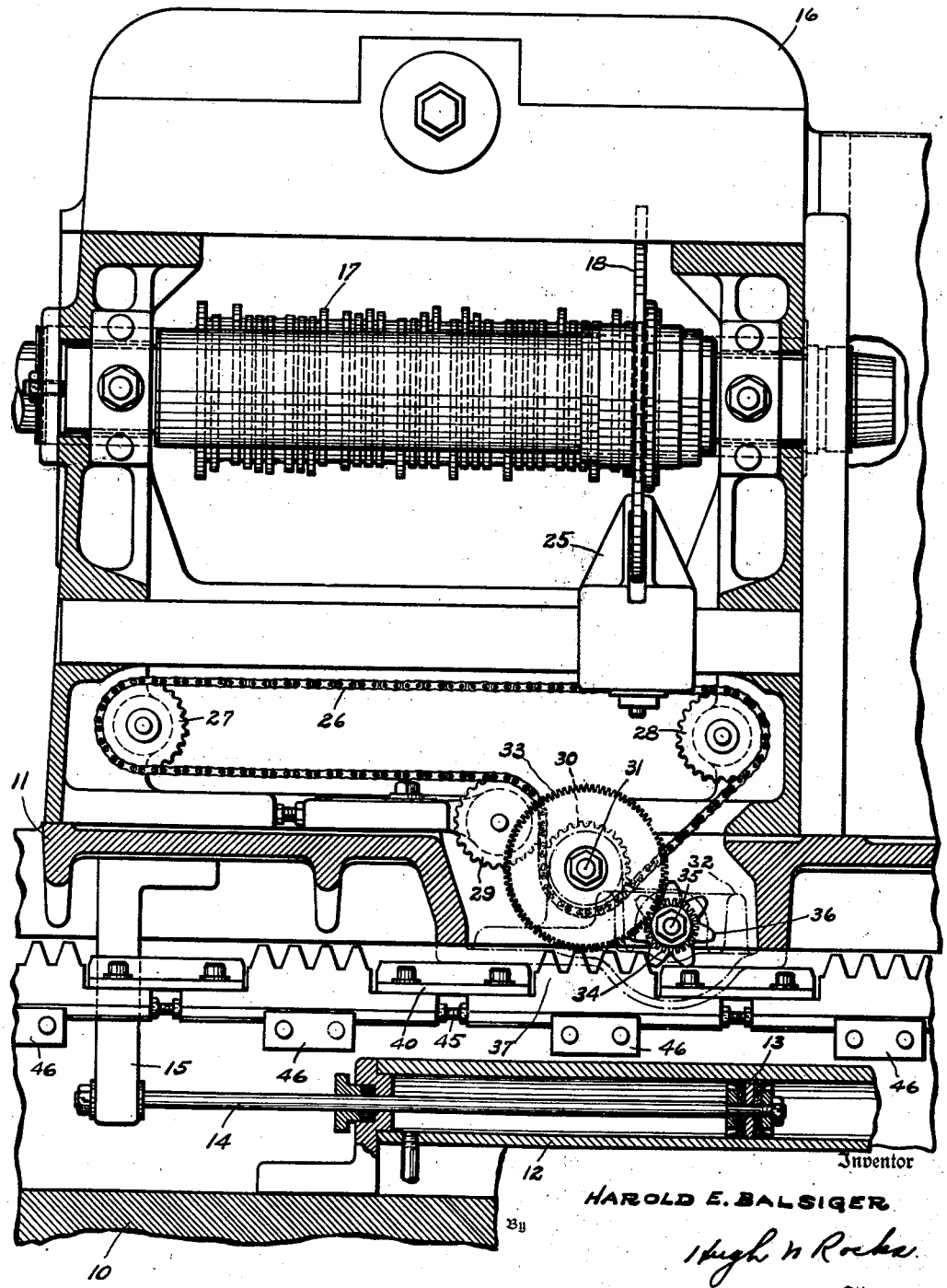

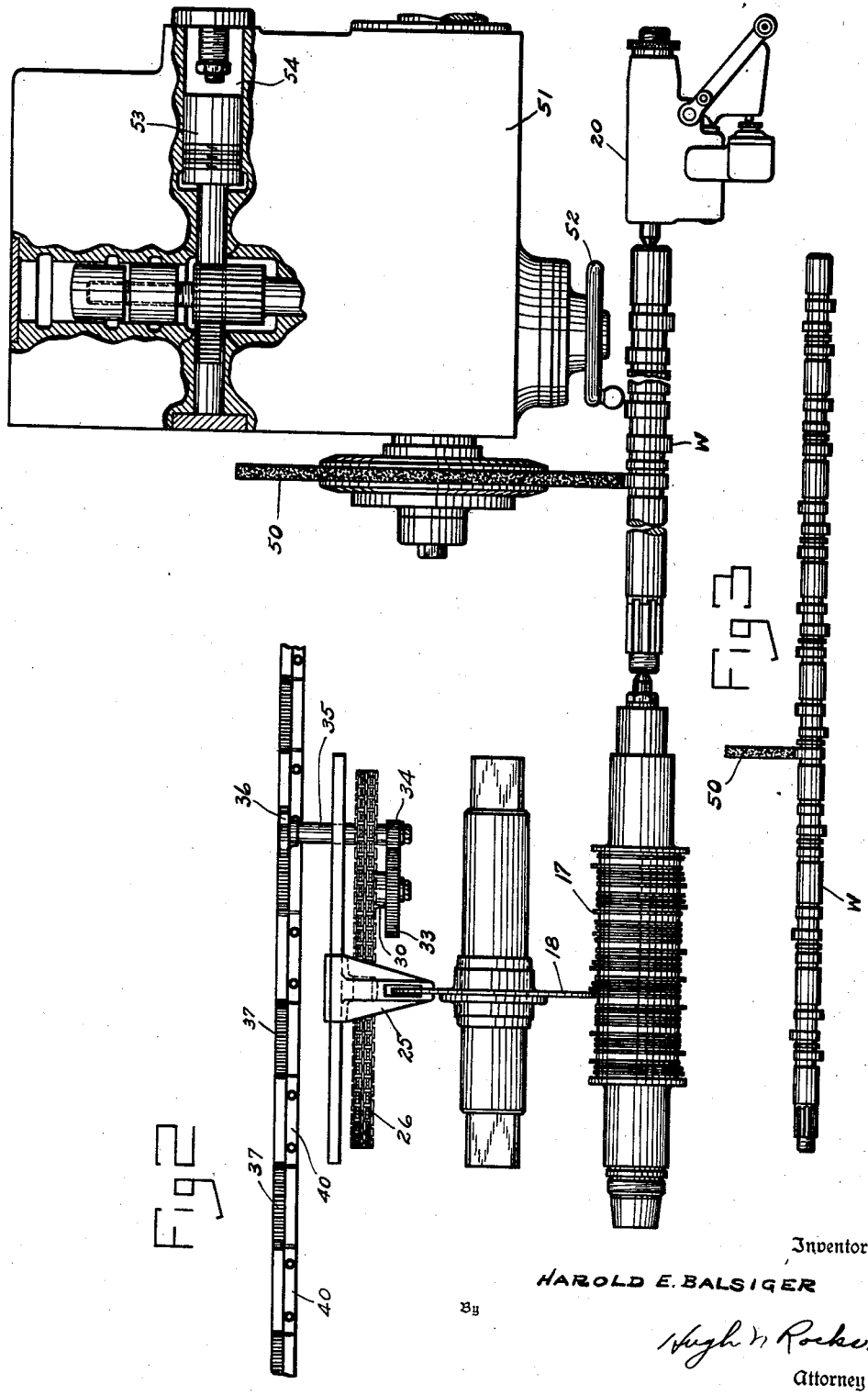

2,323,189

UNITED STATES PATENT OFFICE 2,323,189

CAM GRINDING MACHINE

Harold E. Balsiger, Waynesboro, Pa., assignor to Landis Tool Company, Waynesboro, Pa.

Application December 23, 1941, Serial No. 424,197

2 Claims. (Cl. 51—101)

This invention relates to indexing mechanisms, particularly for shifting the master cam follower of a machine for grinding cam shafts.

Most automotive cam shafts consist of groups of closely spaced cams. The space between the groups may be as great or greater than the space occupied by a given group. If the work carriage movement is synchronized directly with the mechanism for shifting the master cam follower, these spaces would have to be reproduced for the master cam. This would require a long master cam and a correspondingly larger headstock.

It is therefore an object of this invention to keep the length of the master cam at a minimum.

A further object is to provide means for rendering the master cam roller shifting mechanism inoperative while the work and wheel are being shifted thru the space between two groups of cams.

A further object is to provide an index mechanism which will be positively locked when in idle position.

Figure 1 is a sectional rear elevation of the headstock.

Figure 2 is a plan view of the principal parts of my mechanism.

Figure 3 shows the type and construction of the work piece.

In the drawings numeral 10 indicates a portion of the bed of a machine, 11 a carriage slidably mounted thereon, 12 a cylinder mounted on said bed, and 13 a piston in said cylinder. Said piston is connected to said carriage by means of a piston rod 14 and a bracket 15. A headstock housing 16 on said carriage includes a master cam 17, a master cam roller 18 rotatably supported thereon, and a mechanism for shifting said roller from one cam to another in timed relation with the movement of carriage 11. A work piece W may be rotatably supported between said headstock and a footstock 20.

The means for shifting the roller 18 from one master cam to another is similar to that shown in Ott Patent 1,993,854 granted March 12, 1935. It consists of a roller engaging bracket 25 mounted on an endless chain 26. Said chain is mounted on a pair of spaced idler sprockets 27 and 28 which determine the extent of movement of the follower. Another idler sprocket 29 is adjustably secured to the carriage so that it can be shifted to take up slack in the chain 26. The driving sprocket 30 is mounted on a shaft 31 rotatably supported in a bracket 32 on said carriage. A gear 33 also mounted on said shaft engages another gear 34 on a shaft 35 with a coarse tooth pinion 36. Pinion 36 engages spaced rack sections 37 mounted on bed 10. In each of said spaces a bar 40 is secured to milled off end portions of adjacent rack sections. The surface of said bar is so positioned relative the rack teeth that two teeth of pinion 36 will engage same simultaneously and thus prevent rotation of said pinion, and shifting of roller 18 during passage from one rack member to another. Said rack sections are mounted for endwise adjustment which may be effected by means of adjusting screws 45. Said sections are held in adjusted position by means of lock blocks 46.

A grinding wheel 50 is rotatably supported on a wheel support 51. Movement of said wheel toward and from operative position may be effected by means of a handwheel 52 and associated part. A rapid feed movement followed by a slower grinding feed may be effected by a piston 53 slidably mounted in cylinder 54 and having suitable means for connecting same to the support 51. Such a feed mechanism is shown and described in Balsiger et al. Patent 2,243,410, granted May 27, 1941, and in copending application Serial No. 377,744 filed February 6, 1941.

The operation of my device is believed to be obvious in view of the above description and no further remarks relative to same are believed necessary.

I claim:

1. A cam grinding machine comprising a grinding wheel support, a grinding wheel rotatably mounted thereon, a support for a cam shaft, said grinding wheel and said work being relatively movable toward and from one another, means including a master cam shaft having master cams thereon and a follower for causing said approaching and receding movement, mechanism for effecting relative longitudinal movement of the cam shaft for positioning said wheel and cam blank in operative relation, and means operable in timed relation with said longitudinal movement to move said follower from cam to cam including a rack having intermittent groups of teeth thereon, a pinion for engaging said teeth and for transmitting movement to said follower to shift same from one master cam to another, and a device between each of said groups of teeth for positively locking said pinion against rotation.

2. A device of the kind described in claim 1 having a bar between each of said groups of rack teeth, said bar having a surface higher than the base of said rack teeth.

HAROLD E. BALSIGER.